United States Patent [19]

Matsueda

[11] Patent Number: 5,352,881
[45] Date of Patent: Oct. 4, 1994

[54] FOCUS CONTROL DEVICE IN OPTICAL RECORDING AND REPRODUCING APPARATUS HAVING AN OPTICAL-BEAM-POSITION JUDGING DEVICE

[75] Inventor: Akira Matsueda, Tachikawa, Japan

[73] Assignee: Olympus Optical Co., Ltd., Tokyo, Japan

[21] Appl. No.: 54,256

[22] Filed: Apr. 30, 1993

[30] Foreign Application Priority Data

May 8, 1992 [JP] Japan .................................. 4-116257
Jun. 5, 1992 [JP] Japan .................................. 4-145752

[51] Int. Cl.$^5$ .................................................. G01J 1/20
[52] U.S. Cl. .............................. 250/201.5; 369/44.41
[58] Field of Search ..................... 250/201.5, 201.4; 369/44.41, 44.42, 44.25, 44.29, 44.35

[56] References Cited

U.S. PATENT DOCUMENTS

| | | | |
|---|---|---|---|
| 5,070,491 | 12/1991 | Horie | 250/201.5 |
| 5,107,101 | 4/1992 | Ando | 250/201.5 |
| 5,157,249 | 10/1992 | Hashimoto et al. | 250/201.5 |
| 5,189,293 | 2/1993 | Leenknegt | 250/201.5 |

FOREIGN PATENT DOCUMENTS

1-191340 8/1989 Japan .
3-80435 4/1991 Japan .

*Primary Examiner*—David C. Nelms
*Attorney, Agent, or Firm*—Armstrong, Westerman, McLeland, Hattori & Naughton

[57] ABSTRACT

A focus control device for an optical head in an optical recording and reproducing apparatus for optically performing recording/reproducing. The focus control device includes an optical detector having a plurality of optical detecting sections for detecting reflected light of an optical beam irradiated to an optical recording medium, an error-signal generating circuit for generating a focus error signal on the basis of an output from the optical detector, and a focus regulating mechanism for regulating a focusing state on a surface of an optical recording medium of the optical beam on the basis of a focus error signal. The focus control device further includes a pseudo-focus-error-signal generating circuit which generates a pseudo focus error signal of a predetermined level for bringing back the focusing point of the optical beam to the control target position. The focus control device further includes an error signal selecting circuit for selectively switching an error signal supplied to the focus regulating mechanism such that a pseudo focus error signal is outputted in place of the focus error signal of an output from the error-signal generating circuit when the focusing point of the optical beam is shifted by a predetermined quantity from the control target position.

8 Claims, 9 Drawing Sheets

$$FE = (1 + \frac{40}{5})\frac{Rg}{5+Rg} \Sigma D - 2\Sigma C$$

FIG.6
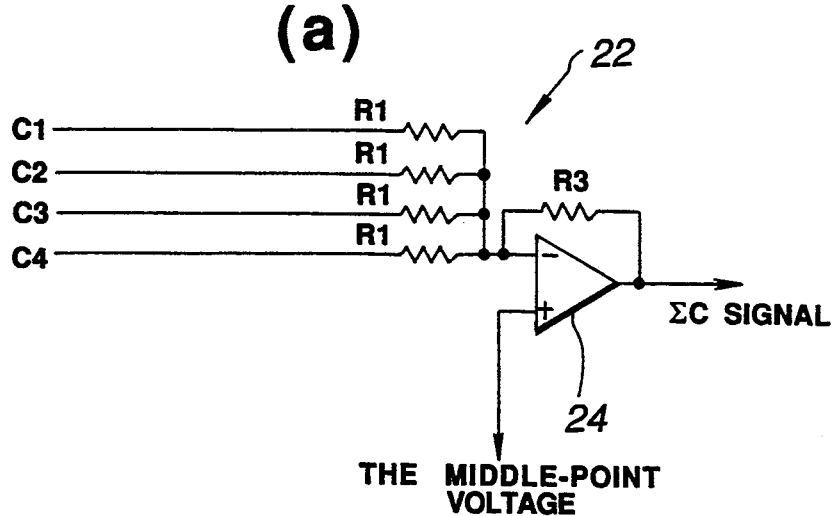
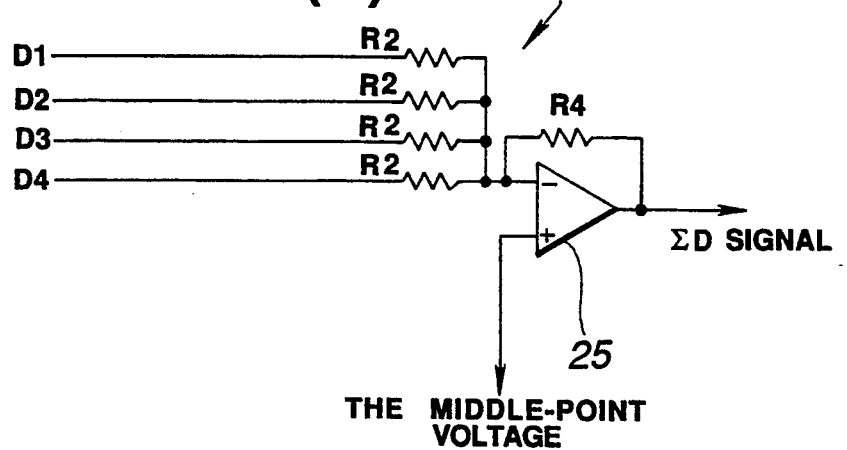
FIG.7
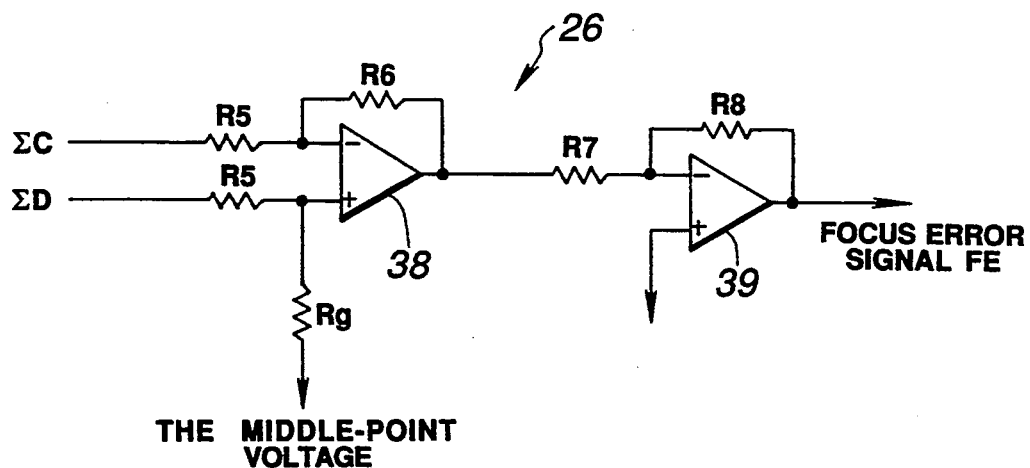

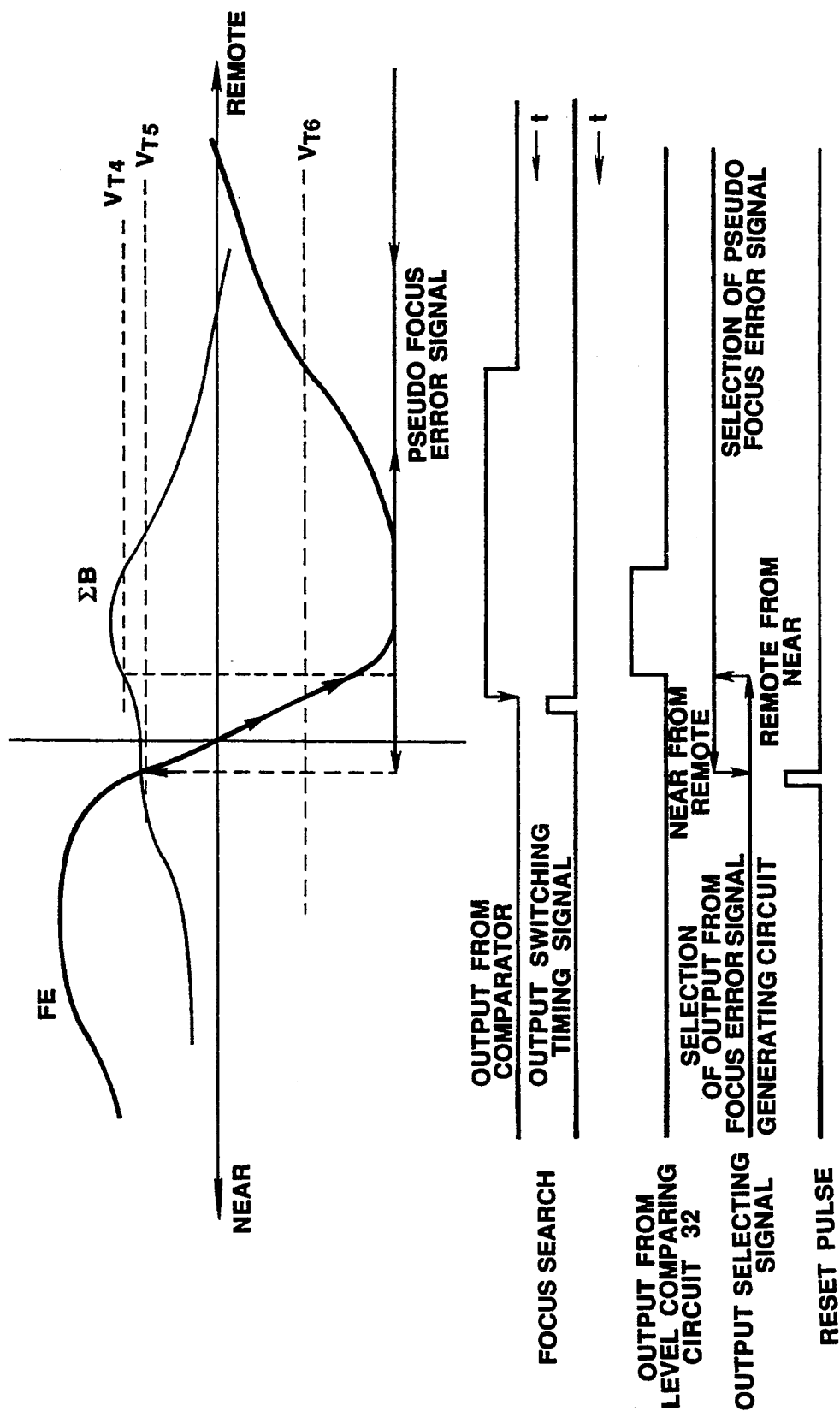

FOCUS CONTROL DEVICE IN OPTICAL RECORDING AND REPRODUCING APPARATUS HAVING AN OPTICAL-BEAM-POSITION JUDGING DEVICE

BACKGROUND OF THE INVENTION

1. Field of the Invention

The present invention relates to a focus control device of an optical head in an optical recording and reproducing (playback) apparatus which performs recording/reproducing optically and, more particularly, to correction of a focus-error signal in a focus servo.

2. Description of the Related Art

As a focus detecting device for use in an optical recording and reproducing apparatus which performs recording/reproducing optically with respect to an optical recording medium, the applicant of the present application has proposed a device in Japanese Patent Laid-Open No. HEI 1-191340/1989, in which light from a light source is projected onto an optical recording medium through a collimator lens, a beam splitter and an objective lens under a defocus condition, and reflected light is received by an optical detector through an objective lens, a beam splitter and an imaging lens. A focus condition of the objective lens with respect to the optical recording medium is detected on the basis of illuminance distribution on the optical recording medium. Further, as a structural arrangement which improves the aforesaid device, a focus detecting device has been proposed in Japanese Patent Laid-Open No. HEI 3-80435/1991 in which an optical element having spherical aberration in an optical path from the light source provided, and a change in illuminance distribution in the form of a medium surface on the basis of spherical aberration on the optical element is detected to detect a focus condition of the objective lens with respect to the optical recording medium.

A structural arrangement of an optical system illustrated in the focus detecting device disclosed in Japanese Patent Laid-Open No. HEI 3-80435/1991 is shown in FIG. 1 of the attached drawings. An optical system is arranged such that light from a light source 1 is projected onto a recording medium 6 in the form of a card, through a sapphire sphere 2 having spherical aberration, a collimator lens 3, a beam splitter 4 and an objective lens 5, and reflected light from the recording medium 6 is received by a light detector 8 through the objective lens 5, the beam splitter 4 and an imaging lens 7. Furthermore, an actuator for driving the objective lens 5 is connected to the objective lens 5. The actuator is provided with a tracking coil 9 and a focusing coil 10. Thus, the objective lens 5 is driven in a tracking direction and in a focusing direction on the basis of a tracking error signal and a focus error signal.

As shown in FIG. 2, the optical detector 8 is used which is arranged by a plurality of light receiving cells. Each pair of four pairs of cells C1 and C2, C3 and C4, D1 and D2, and D3 and D4 for generating a tracking error signal and a focus error signal are so provided as to be spaced from each other in a track widthwise direction so as to be opposed against each other and are so arranged as to receive an image 11 of an edge portion of a guide pattern of the recording medium 6. Moreover, four pairs of clock generating cells B1 and B2 are arranged between the cells D1 and D2, and D3 and D4 so as to be spaced from each other in the track direction. Further, sixteen (16) data lead cells 13 are arranged in the track widthwise direction of a central portion so as to correspond to a data recording position of the recording medium 6.

The cells C1~C4 and D1~D4 for generating the focus and tracking error signal are connected to the focus error signal generating circuit 14 illustrated in FIG. 3 so that a focus error signal is generated on the basis of outputs from the cells C1~C4 and D1~D4. In this connection, although not shown, the cells C1~C4 and D1~D4 are connected also to the tracking-error-signal generating circuit so that a tracking error signal is generated. However, the detailed description thereof will be omitted. The cells C1~C4 are connected to a negative input end of a differential amplifier 15, respectively, through resistors R1. On the other hand, the cells D1~D4 are connected to a positive input end of the differential amplifier 15, respectively, through resistors R2. Moreover, the middle-point voltage is supplied to the positive input end of the differential amplifier 15 through a resistor Rg.

A sum signal ($\Sigma$C) of the outputs from the respective cells C1~C4 and a sum signal ($\Sigma$D) of the outputs from the respective cells D1~D4 form signals which vary depending upon a distance from a medium surface of the objective lens as shown in FIG. 4. Thus, there can be provided a focus error signal FE which becomes zero at a control target position if the respective sum signals $\Sigma$C and $\Sigma$D are amplified by gains different from each other and are subtracted. That is, a focus condition of the objective lens can be detected by the focus error signal FE. Here, the resistor Rg is a resistor which decides a gain with respect to a sum signal of the outputs from the cells C1~C4 and D1~D4. Assuming that R1=R2=20 k$\Omega$ and R3=40 k$\Omega$ and that a ratio between $\Sigma$C and $\Sigma$D at the control target position is 1:1.5, then Rg becomes 0.86 k$\Omega$.

The focus error signal FE is supplied to the focusing coil 10 of the actuator through a driving step, and the objective lens 5 is driven, whereby the objective lens 5 is controlled so as to become a defocus condition which is a target with respect to the recording medium 6.

The aforementioned conventional focus detecting device, however, has a problem in that, as will be seen from FIG. 4, the focus error signal FE crosses a zero point twice. Specifically, there is a point where a value of the focus error signal FE becomes zero (secondary zero cross point) at a position where the objective lens 5 is largely spaced away from the recording medium 6. Accordingly, if the distance between the objective lens 5 and the recording medium 6 crosses the secondary zero cross point and is largely spaced further over the secondary zero cross point by refuse on the recording medium 6, defects, disturbance and the like, the following deficiencies occur. That is, there occurs a focus error signal having polarity which further spaces the objective lens 5 and the recording medium 6 away from each other. It is impossible to maintain the objective lens at a control target position.

OBJECTS AND SUMMARY OF THE INVENTION

It is an object of the invention to provide a focus control device in an optical recording and reproducing apparatus, which can prevent focus failure from occurring even in a case where an objective lens is spaced largely away from a control target position, which is strong with respect to contaminants on the recording medium, a defect, impact from the outside and the like, and which can perform stable focus control.

According to the invention, there is provided a focus control device in an optical recording and reproducing apparatus, which includes optical detecting means having a plurality of optical detecting sections for detecting reflected light of an optical beam irradiated to an optical recording medium, error signal generating means for generating a focus error signal on the basis of an output from the optical detecting means, and focus regulating means for regulating a focusing state on a surface of said optical recording medium of the optical beam on the basis of the focus error signal. The focus control device further includes a pseudo-focus-error-signal generating means which generates a pseudo focus error signal of a predetermined level for bringing back the focusing point of the optical beam to the control target position, and error signal selecting means for selectively changing over an error signal supplied to the focus regulating means so as to output the pseudo focus error signal in place of a focus error signal of an output from the error signal generating means when the focusing point of the optical beam is shifted a predetermined quantity from the control target position.

Other objects, features and advantages of the present invention will sufficiently become apparent from the following explanation.

BRIEF DESCRIPTION OF THE DRAWINGS

FIGS. 5 to 8 relate to a first embodiment of the invention;

FIG. 5 is a block diagram showing an arrangement of a focus control circuit;

FIG. 6 is a circuit view showing an arrangement of an adding circuit which adds outputs from respective cells for generating the focus error signal;

FIG. 7 is a circuit view showing an arrangement of a difference circuit which computes a difference of a plurality of adding outputs from the adding circuit shown in FIG. 6, to output the difference as a focus error signal;

FIG. 8 is a waveform view for explanation of operation of a focus control circuit in the first embodiment;

FIG. 9 is a block diagram showing an arrangement of a focus control circuit;

FIG. 10 is a waveform view for explanation of operation of the focus control circuit in a second embodiment;

FIGS. 11 and 12 relate to a third embodiment of the invention;

FIG. 11 is a block diagram showing an arrangement of a focus control circuit; and FIG. 12 is a waveform view for explanation of operation of the focus control circuit in the third embodiment of the invention.

DETAILED DESCRIPTION OF THE PREFERRED EMBODIMENTS

FIGS. 5 to 8 show a first embodiment of the invention.

Figure 1:
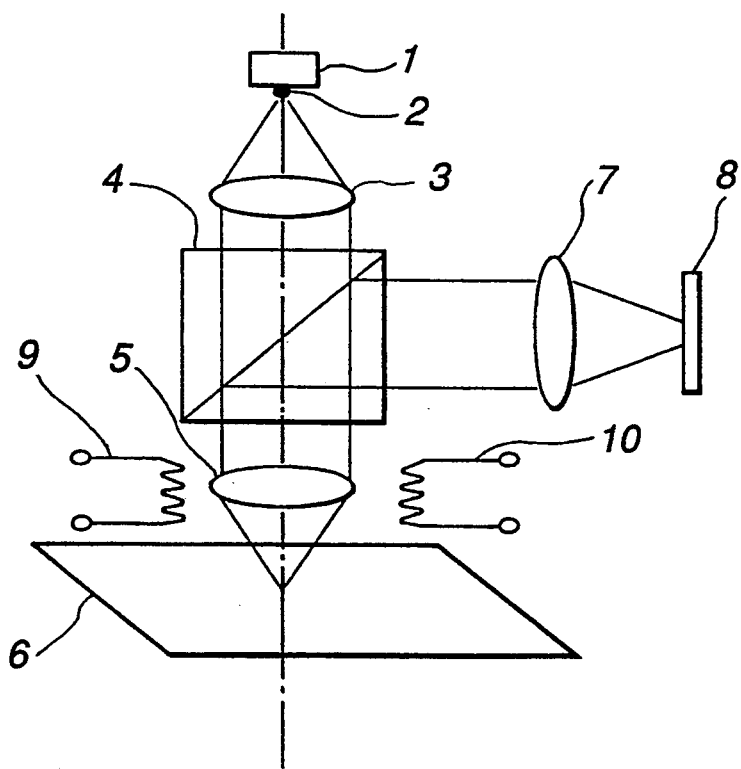
FIG. 1 is an explanatory diagram, showing an arrangement of an optical system of a focus detecting device.
Figure 2:
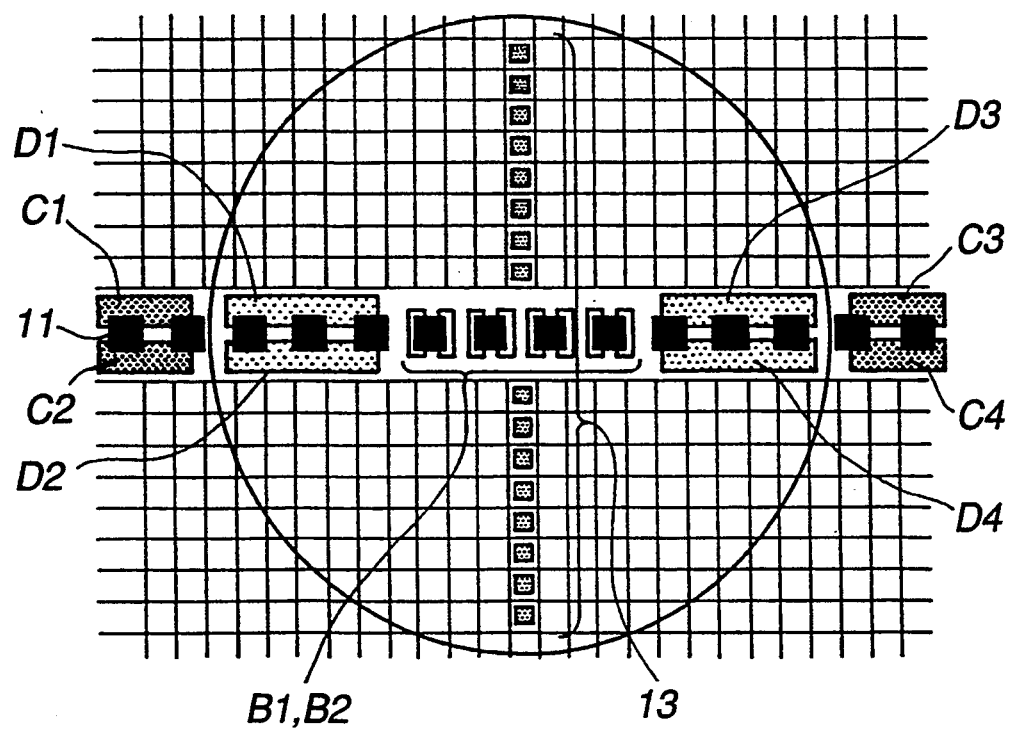
FIG. 2 is an explanatory diagram, showing an arrangement of light receiving cells of an optical detector.
Figure 3:
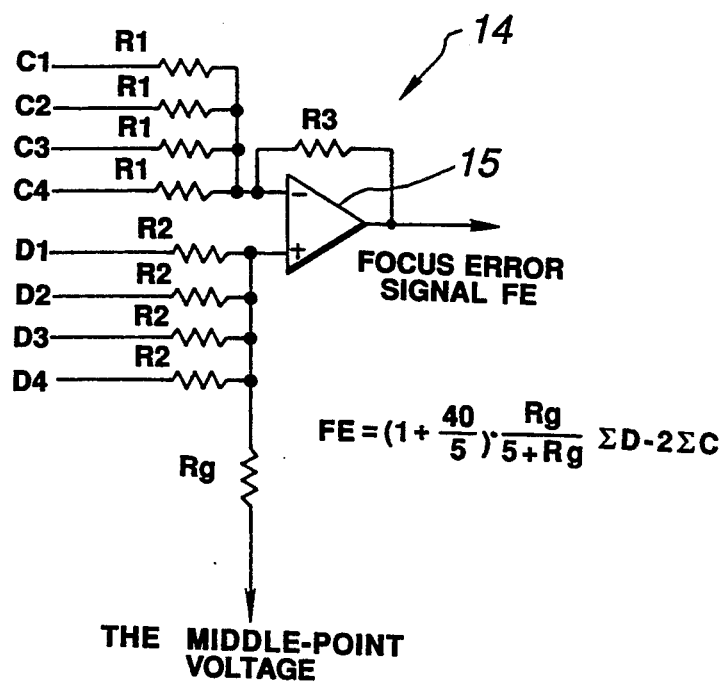
FIG. 3 is a circuit diagram showing an arrangement of a focus-error-signal generating circuit.
Figure 4:
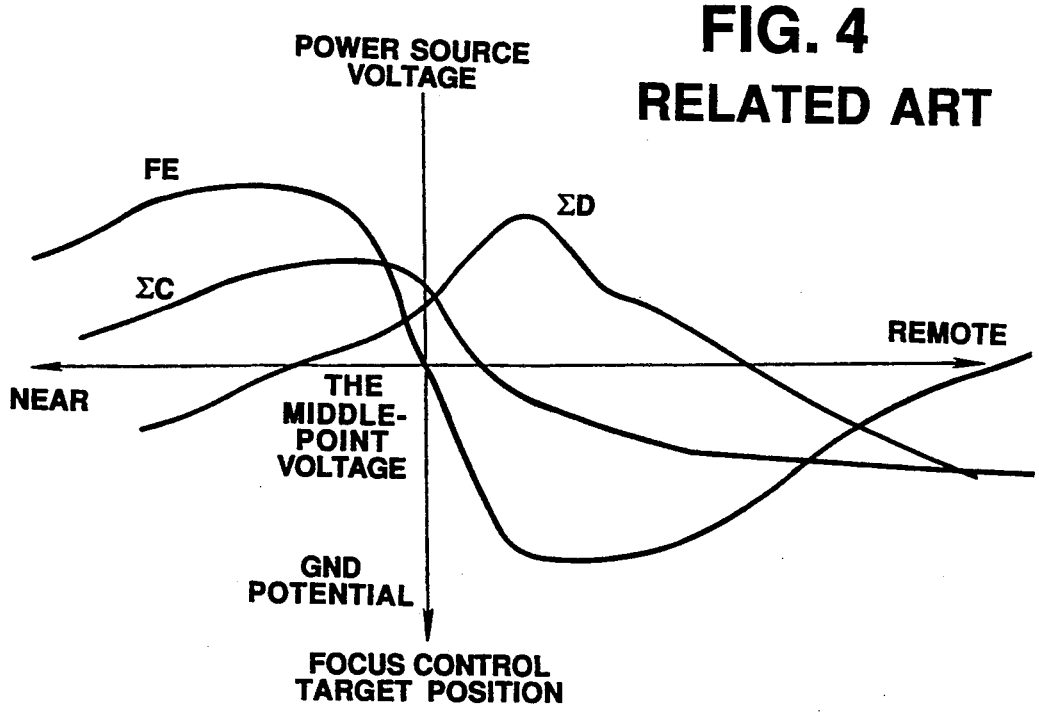
FIG. 4 is a waveform view showing a focus error signal of a conventional device.
Figure 5:
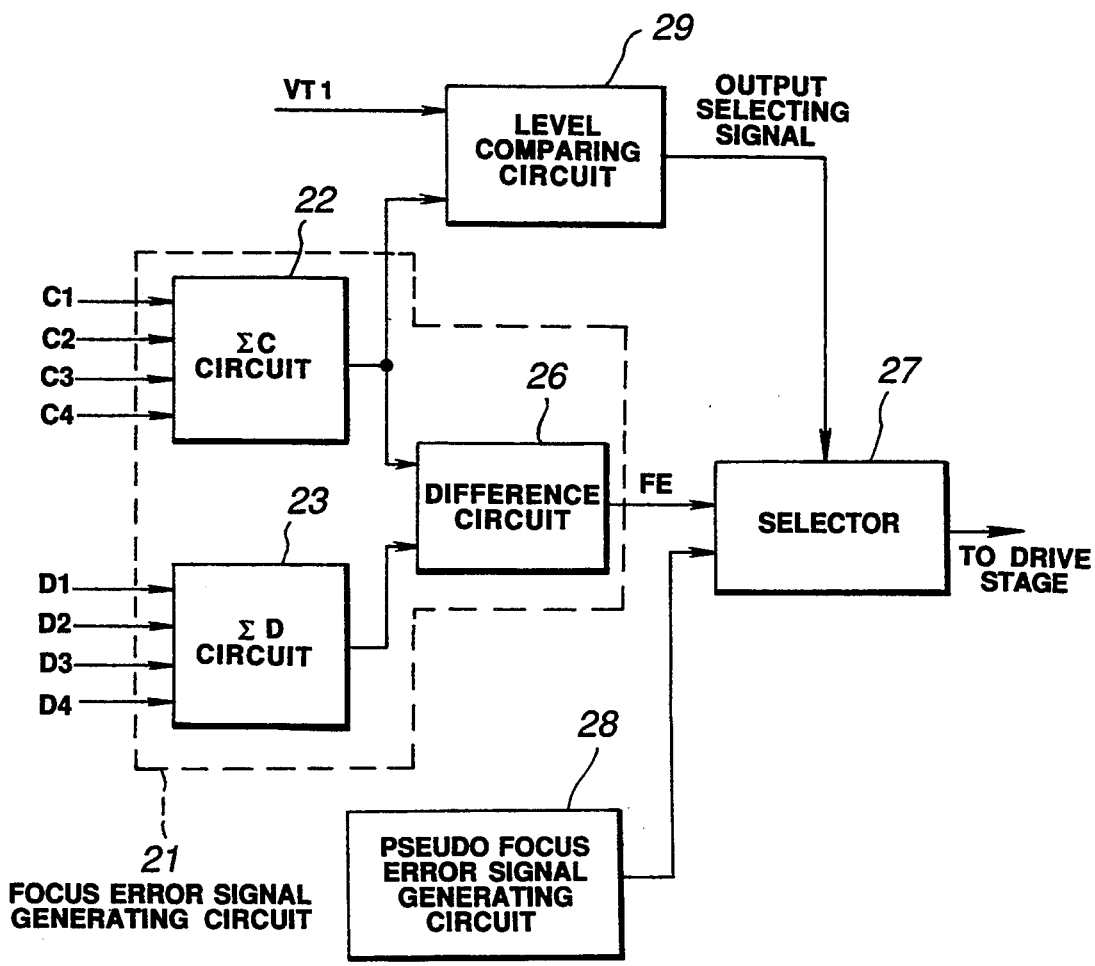

FIG. 5 shows an arrangement of a focus control circuit which outputs a focus error signal for driving an objective lens on the basis of an output from an optical detector which receives reflected light from an optical recording medium. The arrangement is such that an output signal from the focus control circuit is inputted to a focusing coil of an actuator through focus regulating means (that is, through a drive stage) to drive the objective lens; thereby performing focus control. In this connection, the optical detector is arranged similarly to that shown in FIG. 2 regarding arrangement of cells and the like. Further, the objective lens and an optical system including drive means for the objective lens are arranged similarly to those shown in FIG. 1, and the description thereof will be omitted here.

In the present embodiment, an optical system (a light source, for example) within a pickup is so arranged as to be purposely or intentionally shifted. When a condition Is brought to a control target condition by focus servo control, a focusing point of an optical beam is located at a position (under a defocus condition) which is shifted from the optical recording medium surface. In this manner, it is well known, as disclosed in Japanese Patent Laid-Open No. HEI 1-191340/1989 filed by the applicant of the present application, to control the optical beam to the defocus condition.

A focus-error-signal generating circuit 21 is provided which serves as error-signal generating means for generating a focus error signal FE on the basis of outputs from cells (optical detecting sections) $C1 \sim C4$ and $D1 \sim D4$ for generation of focus and tracking error signals of the optical detector. The cells $C1 \sim C4$ and cells $D1 \sim D4$ are connected to the focus-error-signal generating circuit 21. The focus-error-signal generating circuit 21 comprises an adding circuit ($\Sigma C$ circuit) 22 for adding outputs from the respective cells $C1 \sim C4$ to each other to generate a sum signal $\Sigma C$, an adding circuit ($\Sigma D$ circuit) 23 for adding outputs from the respective cells $D1 \sim D4$ to each other to generate a sum signal $\Sigma D$, and a difference circuit 26.

The cells $C1 \sim C4$ for generation of the focus and tracking error signals are connected to the $\Sigma C$ circuit 22 so that there can be provided the sum signal $\Sigma C$ of the outputs from the respective cells $C1 \sim C4$. On the other hand, the cells $D1 \sim D4$ are connected to the $\Sigma D$ circuit 23 so that there can be provided the sum signal $\Sigma D$ of the outputs from the cells $D1 \sim D4$.

The $\Sigma C$ circuit 22 is arranged as shown in FIG. 6(a), and the cells $C1 \sim C4$ are connected to a negative input end of an amplifier 24 respectively resistors R1. On the other hand, the mid-point voltage is supplied to a positive input end of the amplifier 24 so that the sum signal $\Sigma C$ is outputted from an output end of the amplifier 24. Moreover, the $\Sigma D$ circuit 23 is arranged similarly to the $\Sigma C$ circuit 22 as shown in FIG. 6(b). The cells $D1 \sim D4$ are connected to a negative input end of an amplifier 25 respectively through resistors R2. The middle-point voltage is supplied to a positive input end of the amplifier 25. The sum signal $\Sigma D$ is outputted from an output end of the amplifier 25. In this connection, resistance values are set to $R1=R2=20$ k$\Omega$, and $R3=R4=40$ k$\Omega$, for example.

The output ends of the respective ΣC circuit 22 and ΣD circuit 23 are connected to the difference circuit 26 so that a focus error signal FE is generated by the sum signals ΣC and ΣD. The difference circuit 26 is arranged as shown in FIG. 7, and the sum signals ΣC and ΣD are inputted respectively to a negative input end and a positive input end of a differential amplifier 38 through the resistors R5. Furthermore, the middle-point voltage is supplied to the positive input end of the differential amplifier 38 through a resistor Rg. The differential amplifier 38 outputs a difference between two inputs (sum signals ΣC and ΣD). An output from the differential amplifier 38 is inputted to a negative input end of an amplifier 39 through a resistor R7, and is amplified by the amplifier 39. Subsequently, the output from the differential amplifier 39 is outputted as a focus error signal FE. Here, respective resistance values are set, for example, such that R5=R7=R8=20 kΩ, and R6=40 kΩ. Further, the resistor Rg is a resistor which determines a gain with respect to the sum signals ΣC and ΣD. Assuming that a ratio between ΣC and ΣD at the control target position is 1:1.5, then Rg is brought to 16 kΩ.

Figure 8:
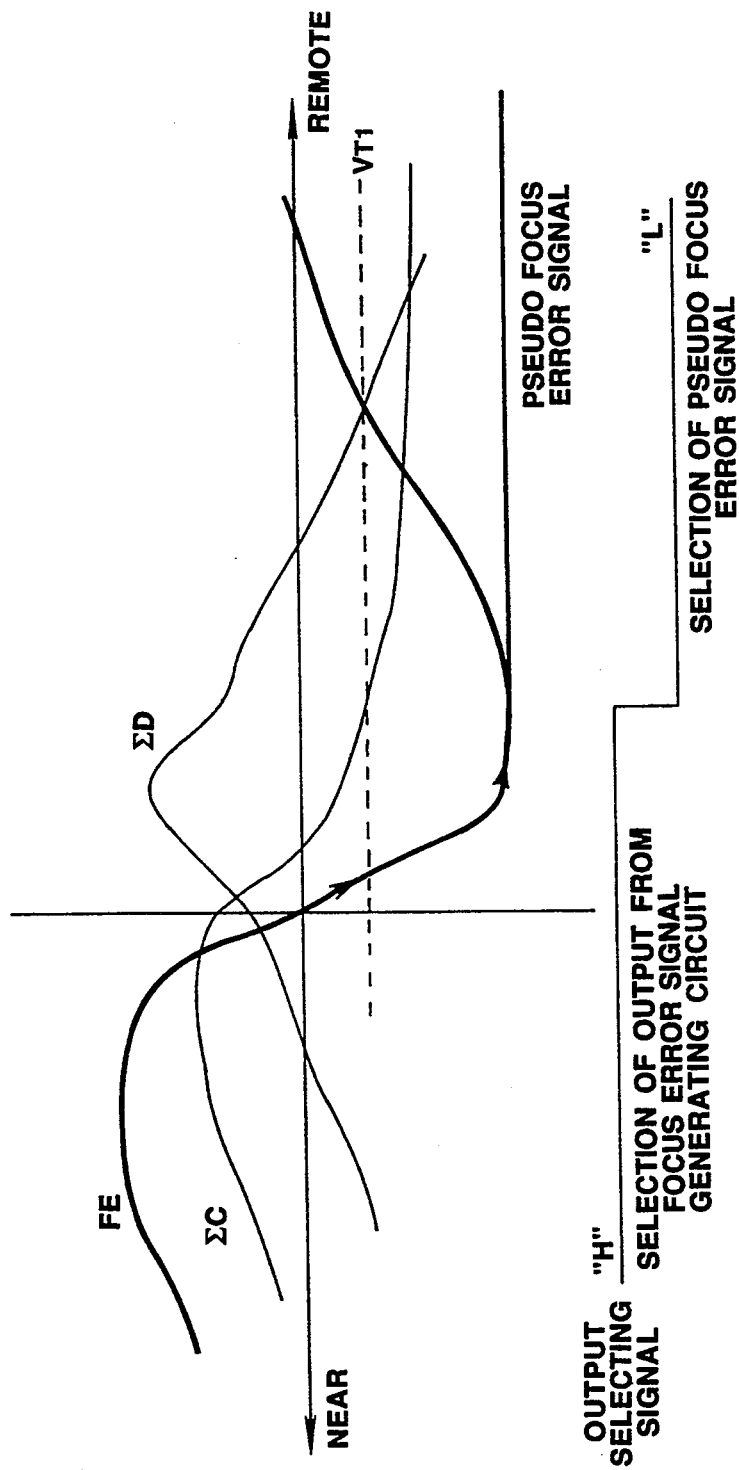

Specifically, in the focus error signal generating circuit 21 including the ΣC circuit 22, the ΣD circuit 23 and the difference circuit 26 serving as the first computing means, generated are the sum signals ΣC and ΣD which vary depending upon a distance from the recording medium surface of the objective lens as shown in FIG. 8, and the focus error signal FE which is brought to zero at the control target position.

The focus-error-signal generating circuit 21 is connected to one of input ends of a selector 27 serving as error-signal selecting means for selecting the focus control error signal which is outputted to the drive stage. Furthermore, a pseudo-focus-error signal generating circuit 28 which generates predetermined DC voltage as a pseudo focus error signal is provided, and connected to the other input end of the selector 27.

The ΣC circuit 22 is also used as second computing means, and is also connected to a level comparing circuit 29 serving as optical-beam-position judging means, and the sum signal ΣC is inputted to one of the input ends of the level comparing circuit 29. A predetermined threshold level $V_{T1}$ for performing comparison is supplied to the other input end of the level comparing circuit 29. The sum signal ΣC is binary-coded by the threshold level $V_{T1}$ in the level comparing circuit 29, whereby it is judged whether or not the voltage level of the sum signal ΣC is smaller than $V_{T1}$. An output selecting signal in accordance with the judging results is inputted to the selector 27.

The selector 27 selects any one of the focus error signal FE from the focus-error-signal generating circuit 21 and the pseudo focus error signal from the pseudo-focus-error-signal generating circuit 28, by the output selecting signal, to output selected one to the drive stage as a focus control error signal for performing focus control. The selected focus control error signal is supplied to a focusing coil of the actuator through the drive stage high in current capacity, so that the objective lens is driven.

The operation of the focus control circuit according to the present embodiment will next be described with reference to FIG. 8.

Here, a case will be described where a distance between the surface of the objective lens and the recording medium is spaced away from the control target position. For example, although the objective lens is located at the control target position, the focus error signal is shifted from the control target potential by contaminants (dirt and dust) on the recording medium, defects and the like. As a result, there is a case where the objective lens is vibrated until the objective lens is shaken (displaced) and is converged after response time of the actuator. Moreover, there is also a case where the objective lens is shaken by impact given from the outside. In this manner, there is a case where the distance between the objective lens and the recording medium is largely spaced away from the control target position, by contaminants on the recording medium, defects thereon, impact from the outside or the like. In the embodiment, however, the objective lens is so arranged as to generate the focus error signal capable of being focus-controlled so as to be brought to the target defocus condition even under such case.

In the focus error signal generating circuit 21, there can be provided the sum signals ΣC and which vary depending upon the distance between the objective lens and the recording medium surface, by the ΣC circuit 22 and ΣD circuit 23 as shown in FIG. 8. Furthermore, the focus error signal FE which is brought to zero at the control target position by the difference circuit 26 is generated, on the basis of the sum signals ΣC and ΣD. In this connection, in FIG. 8, the ordinate indicates voltage, while the abscissa indicates a distance between the objective lens and the recording medium surface. Any one of the focus error signal FE outputted from the focus-error-signal generating circuit 21 and the pseudo focus error signal that is the negative DC voltage outputted from the pseudo-focus-error-signal generating circuit 28 is selected by the selector 27, and is outputted. At this time, the selector 27 selects the output on the basis of the output selecting signal from the level comparing circuit 29.

In the neighborhood of the control target position, since the sum signal ΣC is larger than the threshold level $V_{T1}$, the output selecting signal of the output from the level comparing circuit 29 is brought to high level ("H"). Accordingly, the selector 27 selects the ordinary focus error signal FE that is an output from the focus-error-signal generating circuit 21 and outputs the same. Here, the threshold level $V_{T1}$ corresponds to the level of the sum signal ΣC at the time the objective lens is located at a position spaced a predetermined distance away from the control target position.

On the other hand, when the objective lens is spaced away from the recording medium surface by contaminants and the like on the recording medium as described previously, the sum signal ΣC decreases. At the time the sum signal ΣC is equalized to the threshold level $V_{T1}$, the output selecting signal from the level comparing circuit 29 is so inverted as to be brought to a low level ("L"). Thus, the selector 27 selects the pseudo focus error signal that is the negative DC voltage outputted from the pseudo-focus-error-signal generating circuit 28, and outputs the same. That is, when the level of the sum signal ΣC decreases less than the threshold level $V_{T1}$, the focus control error signal outputted is switched or changed over to the pseudo focus error signal.

Here, even if the objective lens is moved further to a long distance by inertia and is displaced to a point (a secondary zero cross point) where the focus error signal FE again exceeds zero, since the pseudo focus error signal is outputted as the focus control error signal, the objective lens is brought back in the control target position direction. When the objective lens is brought back so that the sum signal ΣC exceeds the threshold level $V_{T1}$, the output selective signal from the level comparing circuit 29 is again brought to "H". The focus error signal FE from the focus-error-signal generating circuit 21 is selected by the selector 27, and is outputted. Since the focus error signal FE is supplied to the actuator, the objective lens is so controlled as to be settled at the control target position.

In this manner, it is utilized that the level of the sum signal of a specific set in the group of light receiving cells of the optical detector which detects the reflected light from the recording medium is asymmetric with each other with the control target position put therebetween, and it is judged whether or not the level is smaller than a predetermined level. On the basis of the judgment, in a case where the objective lens is spaced away from the control target position, the pseudo focus error signal is outputted to correct the focus error signal, whereby even in a case where the objective lens is largely spaced away from the control target position, focus coming-off or failure can be prevented from occurring. The objective lens is strong with respect to contaminants, detects, impact from the outside with respect to the recording medium. Thus, it is possible to perform stable focus control.

Figure 9:
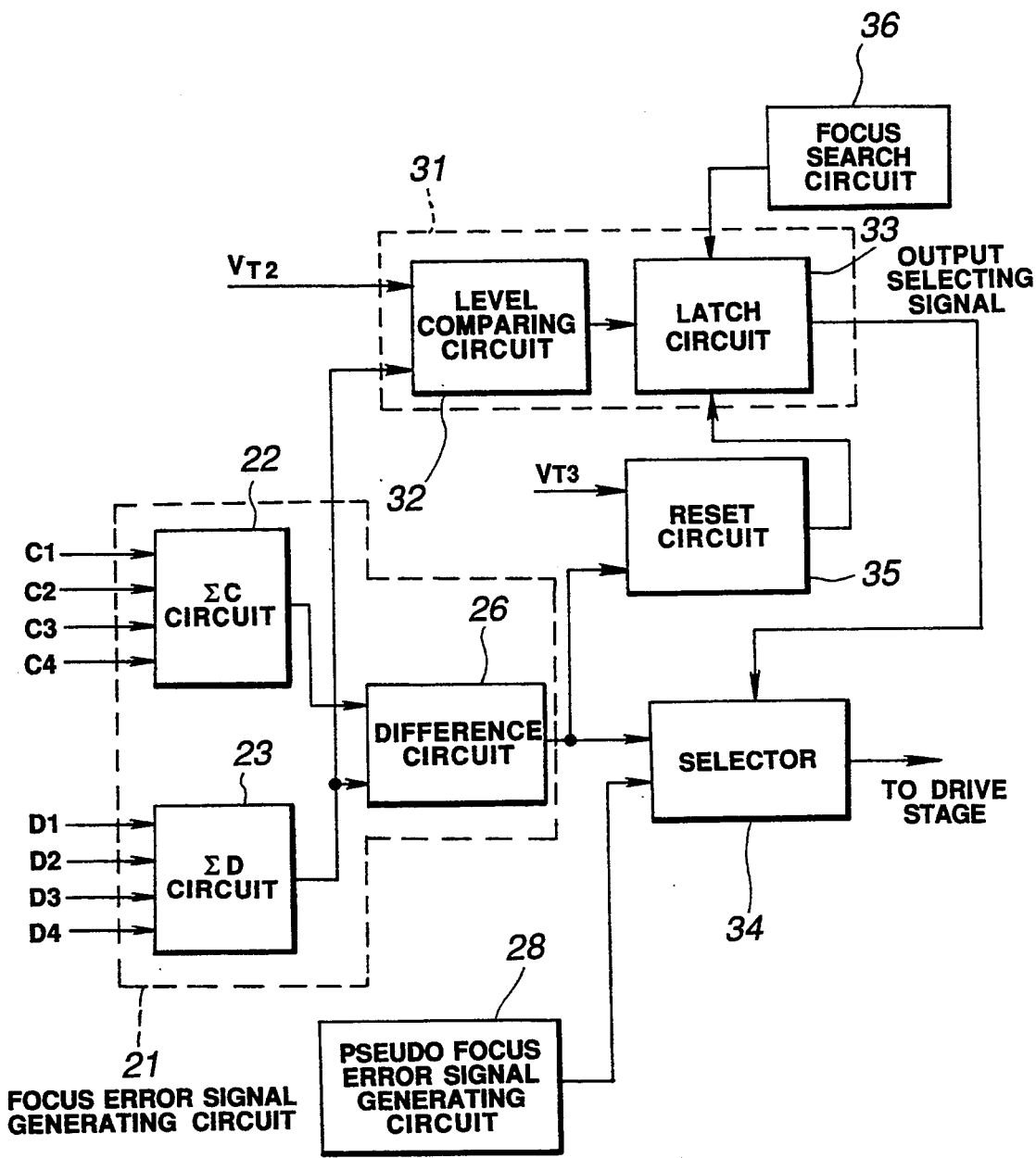
FIGS. 9 and 10 relate to a second embodiment of the invention.
Figure 10:
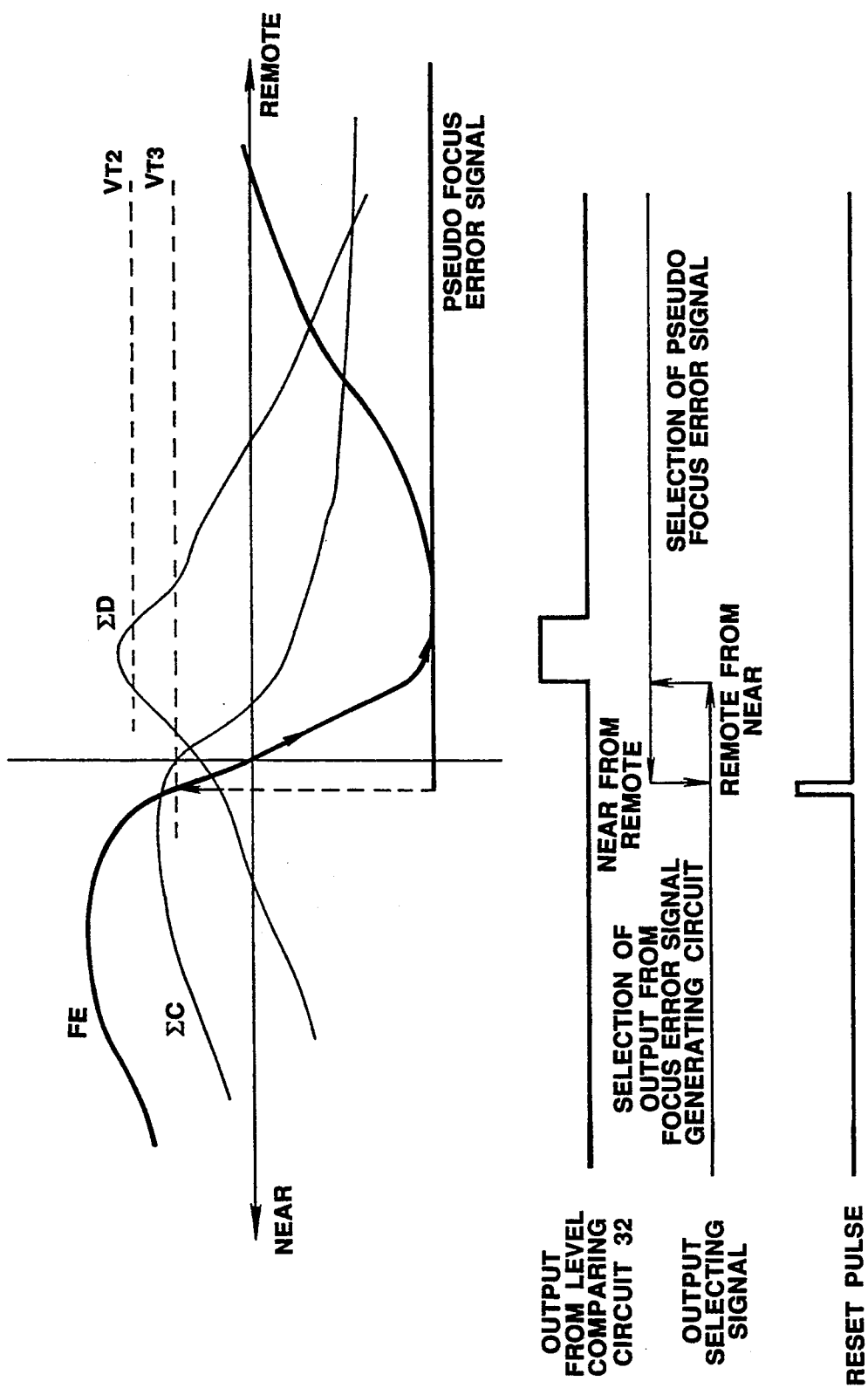

FIGS. 9 and 10 show a second embodiment of the invention.

In the second embodiment, as shown in FIG. 9, a signal-level judging circuit 31 is provided which compares a sum signal ΣD of outputs from a ΣD circuit 23 with a threshold level in place of the level comparing circuit 29 which compares the sum signal ΣC in the first embodiment with the threshold level. The arrangement is such that an output selective signal is generated for selecting the outputted focus control error signal outputted.

The signal-level judging circuit 31 comprises a level comparing circuit 32 having one end thereof to which a ΣD circuit 23 is connected so that the sum signal ΣD is inputted, and the other end to which a threshold level $V_{T2}$ is supplied to compare the threshold level $V_{T2}$ and the sum signal ΣD with each other, and a latch circuit 33 consisting of a D-flip flop. The level comparing circuit 32 is arranged such that the sum signal ΣD is binary-coded at the threshold level $V_{T2}$, to thereby judge whether or not the voltage level of the sum signal ΣD is larger than $V_{T2}$. In a case where the voltage level of the sum signal ΣD exceeds $V_{T2}$, "H" is supplied to a clock terminal of the latch circuit 33. The latch circuit 33 is arranged such that when a pulse having a straight polarity (building-up or leading pulse) is inputted to the clock terminal, an output therefrom is brought to "H", and the "H" is outputted to a selector 34 as an output selective signal. By the output selective signal, any one of the focus error signal FE from the focus-error-signal generating circuit 21 and the pseudo focus error signal from the pseudo-focus-error-signal generating circuit 28 is selected in the selector 34, and selected signal is outputted to the drive stage as a focus control error signal for performing focus control.

Furthermore, a reset circuit 35 is provided for resetting the latch circuit 33. The reset circuit 35 has one end thereof to which the focus error signal FE from the focus-error-signal generating circuit 21 is inputted, and the other end to which the threshold level $V_{T3}$ and the focus error signal FE are inputted. The reset circuit 35 is arranged such that a threshold level $V_{T3}$ and the focus error signal FE inputted to the other end of the reset circuit 35 are compared with each other, and in a case where the focus error signal FE exceeds $V_{T3}$, a reset pulse is outputted to the latch circuit 33. Further, a focus search circuit 36 which performs focus search at initial operation of the circuit is provided to detect that the objective lens is located at the control target position which is brought to the target defocus condition and, at completion of search, a clear pulse is outputted to the latch circuit 33.

The other is arranged similarly to the first embodiment. The same reference numerals are applied to the same constitutional elements, and the description thereof will be omitted.

Operation of the focus control circuit according to the present embodiment of the invention will next be described with reference to FIG. 10.

First, focus search is performed by the focus search circuit 36, to detect that the objective lens is located at the control target position. At completion of the focus search, a clear pulse is outputted to the latch circuit 33. By doing so, the latch circuit 33 is cleared so that the output is brought to "L". Subsequently, the focus control circuit is operated. Here, a case where the objective lens is spaced away from the control target position will be described.

Immediately after initiation of the operation, since the sum signal ΣD is lower than the threshold level $V_{T2}$, the output from the level comparing circuit 32 is "L". Accordingly, the output from the latch circuit 33, that is, the output selective signal is maintained "L". The selector 34 selects the ordinary focus error signal FE that is the output from the focus-error-signal generating circuit 21 and outputs the same. Here, the sum signal ΣD is brought to a maximum value when the objective lens is located at a position spaced a predetermined distance from the control target position, and the threshold level $V_{T2}$ corresponds to a value in the vicinity of the maximum value.

As the objective lens is moved away from the control target position, the level of the sum signal ΣD increases and approaches the peak point. However, at the time the level of the sum signal ΣD is equalized to the threshold level $V_{T2}$, the output from the level comparing circuit 82 is inverted and becomes "H" to set the latch circuit 33. By doing so, the output from the latch circuit 33, that is, the output selective signal is brought to "H". The selector 34 selects the pseudo focus error signal that is negative DC voltage outputted from the pseudo-focus-error-signal generating circuit 28 and outputs the same. Specifically, when the level of the sum signal exceeds the threshold level $V_{T2}$, the focus control error signal outputted is switched to the pseudo focus error signal.

On the other hand, during the time, the focus error signal FE from the focus-error-signal generating circuit 21 is also simultaneously compared with the threshold level $V_{T3}$ by the reset circuit 35. However, since the focus error signal FE is lower than $V_{T3}$, a reset pulse is not outputted, and the output selective signal is maintained "H". Here, the threshold level $V_{T3}$ corresponds to a level of the focus error signal FE at the time the objective lens is in the position approaching a predetermined distance from the control target position.

Here, even if the objective lens is moved further away by inertia and is displaced to a point where the focus error signal FE again exceeds zero (secondary zero cross point), the pseudo focus error signal is outputted as the focus control error signal. Accordingly, the objective lens is brought back in the direction of the control target position. When the objective lens is brought back so that the focus error signal FE from the focus-error-signal generating circuit 21 exceeds a zero point and exceeds the threshold level $V_{T3}$, the reset circuit 35 outputs a reset pulse to reset the latch circuit 33. By doing so, the output selective signal is again brought to "L". The focus error signal FE from the focus error signal generating circuit 21 is selected by the selector 34 and is outputted, and is supplied to the actuator. Accordingly, the objective lens is so controlled as to be settled down at the control target position.

In connection with the above, in the present embodiment, the situation may occur in which the focus error signal FE exceeds the threshold level $V_{T3}$ at a point further far away from the secondary zero cross point of the focus error signal, and the focus error signal FE is selected by the selector 34 and is outputted. In this case, focus coming-off or failure occurs. However, the negative DC level of the pseudo focus error signal outputted from the time the level of the sum signal $\Sigma D$ exceeds the threshold level $V_{T2}$ is high, and is outputted even at a location remote from the secondary zero cross point. Since a force bringing back the objective lens in the direction of the control target position is high, there is nothing left that the objective lens is displaced to a great distance to a point where the focus error signal FE exceeds the threshold level $V_{T3}$. Thus, the possibility is a low focus failure occuring is low.

In this manner, even in the present embodiment, in case where the objective lens is remote from the control target position, the pseudo focus error signal is outputted to correct the focus error signal. When the objective lens exceeds the control target position and approaches, the original focus error signal FE is outputted, whereby, even in a case where the objective lens is largely spaced away from the control target position, it is possible to prevent focus failure from occurring.

Figure 11:
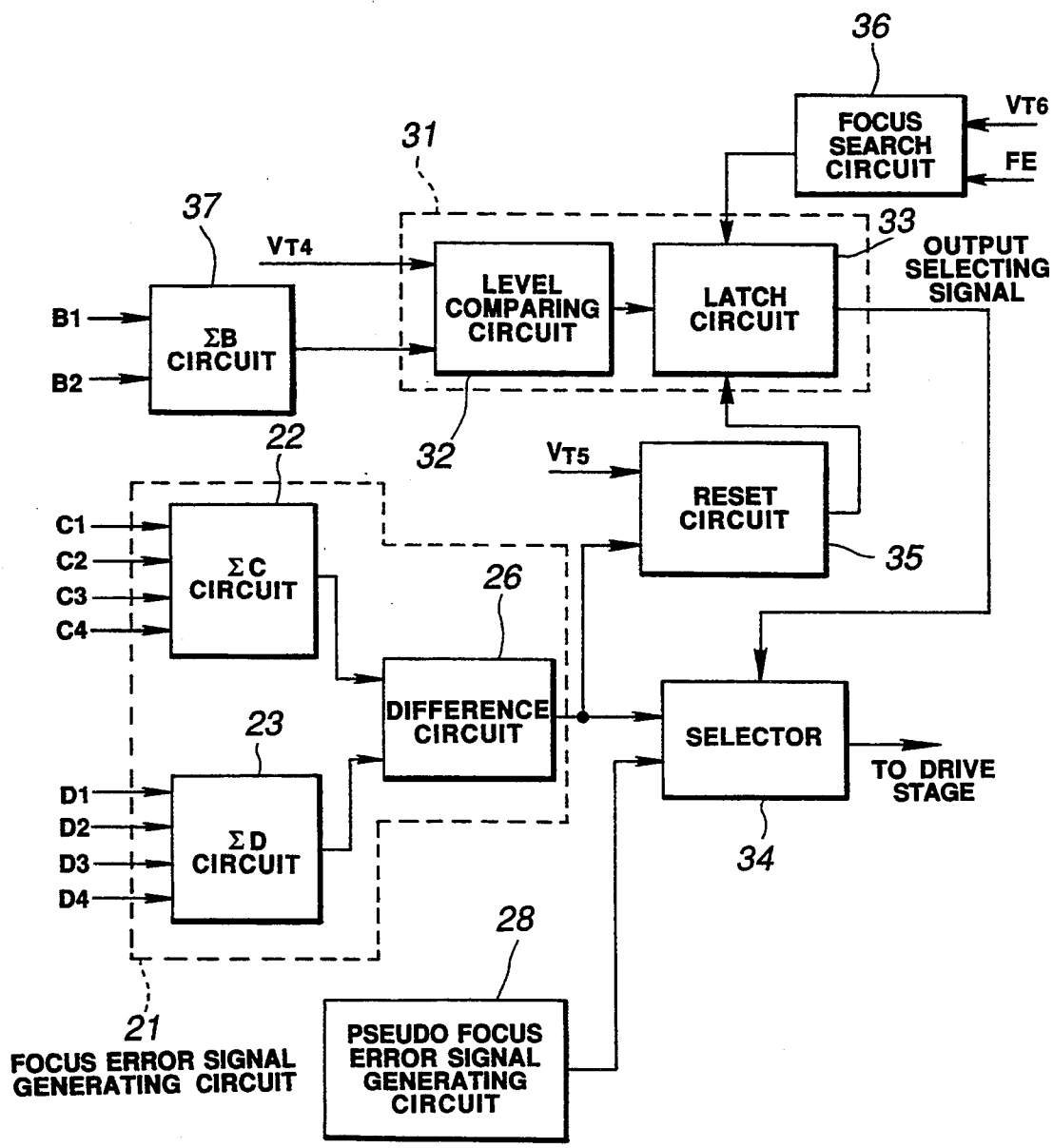

FIGS. 11 and 12 show a third embodiment of the invention.

In the third embodiment, as shown in FIG. 11, a signal level judging circuit 31 is provided similarly to the second embodiment, in place of the level comparing circuit 29 which compares the sum signal $\Sigma C$ with the threshold level in the first embodiment. The arrangement is such that an output selective signal for selecting a focus control error signal in which a sum signal $\Sigma B$ in which outputs from four pairs of clock generating cells B1 and B2 are added to each other is compared with a threshold level and is outputted is generated.

A signal-level judging circuit 31 is so arranged as to comprise a level comparing circuit 32 and a latch circuit 33 consisting of a D-flip flop. An adding circuit ($\Sigma B$ circuit) 37 in which outputs from the four pairs of clock generating cells B1 and B2 are added to each other to generate the sum signal $\Sigma B$ is connected to one of input ends of the level comparing circuit 32. The clock generating cells B1 and B2 are normally used to take a difference between the sum signal B1 at the odd-number and the sum signal B2 at the even-number to generate the clock.

The $\Sigma B$ circuit 37 is arranged similarly to the $\Sigma C$ circuit 22 and the $\Sigma D$ circuit 23 shown in FIG. 6, and is also arranged such that the outputs from the respective cells are added to each other to obtain the sum signal $\Sigma B$. The sum signal $\Sigma B$ is brought to the maximum output since, as shown in FIG. 12, illuminance energy per unit area becomes the largest at a position (a position where the optical beam focuses on the surface of the optical recording medium) slightly shifted from the control target position.

The level comparing circuit 32 of the signal level judging circuit 31 is arranged such that a threshold level $V_{T4}$ is supplied to the other input end, the sum signal $\Sigma B$ is binary-coded at the threshold level $V_{T4}$ to thereby judges whether or not the voltage level of the sum signal $\Sigma B$ is larger than $V_{T4}$, and, in a case where $V_{T4}$ is exceeded, "H" is supplied to the clock terminal of the latch circuit 33.

The latch circuit 33 is arranged such that, similarly to the second embodiment, when the straight polarity pulse is inputted to the clock terminal, an output therefrom is brought to "H", and the "H" is outputted to a selector 34 as an output selective signal. By the output selective signal, any one of the focus error signal FE from the focus-error-signal generating circuit 21 and the pseudo focus error signal from the pseudo-focus-error-signal generating circuit 28 is selected in the selector 34, and the selected one is outputted to a drive stage as the focus control error signal for performing focus control.

Moreover, a reset circuit 35 is provided for resetting the latch circuit 33. The reset circuit 35 has one end thereof to which the focus error signal FE from the focus-error-signal generating circuit 21 is inputted, and the other end. A threshold level $V_{T5}$ inputted to the other end of the reset circuit 35 and the focus error signal FE are compared with each other, and, in a case where the focus error signal FE exceeds $V_{T5}$, a reset pulse is outputted to the latch circuit 33. Further, similarly to the second embodiment, a focus search circuit 36 which performs focus search at the time of initial operation of the circuit is provided and which detects that the objective lens is located at a control target position in which the objective lens is brought to a target defocus condition, to output the clear pulse to the latch circuit 33 at the completion of the search.

Others are arranged similarly to the first embodiment. The same reference numerals are applied to the same constitutional elements, and the description thereof will be omitted.

Operation of the focus control circuit according to the third embodiment will next be described with reference to FIG. 12.

First, similarly to the second embodiment, focus search is performed by the focus search circuit 36, to detect that the objective lens is located at the control target position, and to output the clear pulse to the latch circuit 33 at completion of the focus search.

Here, focus search operation due to the focus search circuit 36 will be described.

As a method of the focus search, a comparator is arranged within the focus search circuit 36, for example, the threshold level of $V_{T6}$ shown in FIG. 12 is supplied to one of input ends of the comparator, and the focus error signal FE is inputted to the other input end. In the present embodiment, the pseudo focus error signal is first outputted from a position where the objective lens is remote from the recording medium, to drive the objective lens in a direction approaching the recording medium. Then, the output from the comparator is brought to one shown in FIG. 12 with time axis taken from the right and expressed in correspondence to a distance between the objective lens and the recording medium surface. Here, focus search circuit 36 detects that the output from the comparator is brought to "L" from "H", to output an output change-over timing signal which changes over the output to the drive stage to the focus error signal FE. From the condition, predetermined time (settling time) awaits unit the focus servo is stabilized. In a case where levels of the lead signals are not all identical with each other (black level under a condition that there is a pit, for example), search completion is judged to output the clear pulse.

In connection with the above, as another method of the focus search, the arrangement may be such that the objective lens once approaches the recording medium over the control target position (a position sensor is provided, and the objective lens stops at a predetermined position on the basis of an output from the position sensor, for example), and the objective lens is driven in a direction spaced away from the recording medium reversely from the position approaching more than the control target position, to output a clear pulse.

When the clear pulse is inputted, the latch circuit 33 is cleared, and an output therefrom is brought to "L". In the future, the focus control circuit operates. Here, a case where the objective lens is remote from the control target position will be described.

Immediately after initiation of operation, since the sum signal $\Sigma B$ is lower than the threshold level $V_{T4}$, the output from the level comparing circuit 32 is "L". Accordingly, the output from the latch circuit 33, that is, the output selective signal is maintained "L". The selector 84 selects the ordinary focus error signal FE that is the output from the focus-error-signal generating circuit 21, and outputs the ordinary focus error signal FE. Here, the sum signal $\Sigma B$ is brought to the maximum value when the objective lens is located at a position remote a predetermined distance from the control target position, and the threshold level $V_{T4}$ corresponds to a value in the vicinity of the maximum value.

As the objective lens is spaced away from the control target position, the level of the sum signal $\Sigma B$ increases and approaches a peak point. However, at the time the sum signal $\Sigma B$ is equalized to the threshold level $V_{T4}$, the output from the level comparing circuit 32 is inverted and is brought to "H" to set the latch circuit 33. By doing so, the output from the latch circuit 33, that is, the output selective signal is brought to "H", and the selector 34 selects the pseudo focus error signal that is negative DC voltage outputted from the pseudo-focus-error-signal generating circuit 28 and outputs the same. Specifically, when the level of the sum signal $\Sigma B$ exceeds the threshold level $V_{T4}$, the focus control error signal outputted is switched to the pseudo focus error signal. The switching to the pseudo focus error signal may be done from the control target position to the secondary zero cross point of the focus error signal FE.

On the other hand, during this, the focus error signal FE from the focus-error-signal generating circuit 21 is also simultaneously compared with the threshold level $V_{T5}$ by the reset circuit 35. Since, however, the focus error signal FE is lower than $V_{T5}$, a reset pulse is not outputted, and the output selective signal is maintained "H". Here, the threshold level $V_{T5}$ corresponds to the level of the focus error signal FE at the time the objective lens is located at a position approaching a predetermined distance from the control target position.

Here, even if the objective lens is moved to a far remote location by inertia so that the focus error signal FE is displaced to a point (secondary zero cross point) which exceeds again zero, since the pseudo focus error signal is outputted as the focus control error signal, the objective lens is brought back in a direction of the control target position. When the objective lens is brought back so that the focus error signal FE from the focus-error-signal generating circuit 21 exceeds the zero point and exceeds the threshold level $V_{T5}$, the reset circuit 35 outputs the reset pulse, and resets the latch circuit 33. By doing so, the output selective signal is again brought to "L". The focus error signal FE from the focus-error-signal generating circuit 21 is selected by the selector 34 and is outputted, and is supplied to the actuator. Accordingly, the objective lens is so controlled as to be settled down to the control target position.

In connection with the above, also in the present embodiment, similarly to the second embodiment, there may occur a condition where the focus error signal FE exceeds the threshold level $V_{T5}$ at a point further remote from the secondary zero cross point of the focus error signal FE, and the focus error signal FE is selected by the selector 34 and is outputted. However, similarly to the second embodiment, since the force bringing back the objective lens in the direction of the control target position by the pseudo focus error signal, the objective lens is rarely displaced to a remote position till a point where the focus error signal FE exceeds the threshold level $V_{T5}$. The possibility of focus failure is low.

Furthermore, in the present embodiment, upon judgment of the defocus condition, the sum signals of the clock generating cells B1 and B2 are used. However, if the detector is a detector for detecting reflected light from the recording medium at the time the objective lens is controlled to the focus control target position, it is possible to utilize the former detector, since an output from the detector develops changes such as $\Sigma B$ and $\Sigma D$. In this connection, in a case where a plurality of detectors are used, a sum signal thereof should be used. Further, as the detector, a detector for detecting light from a central portion is desirable more than a detector for detecting light from a peripheral portion of an optical beam.

In this manner, also in the present embodiment, in a case where the objective lens is remote from the control target position, the pseudo focus error signal is outputted to correct the focus error signal, and the original focus error signal FE is outputted when the objective lens approaches over the control target position, whereby it is possible to prevent focus failure from occurring even in a case where the objective lens is largely remote from the control target position.

In connection with the above, the present invention should not be limited to the focus-error-signal detecting method illustrated in the embodiments. Cells for the partial output and for generation of other clocks which are produced by generation of the focus error signal by computation from the outputs from a plurality of cells are used, whereby it is possible to correct the focus error signal similarly to the embodiments. For example, when the objective lens is located at a position far remote from the control target position, in a case where the outputs from the partial cells monotone-increases (decreases) in accordance with a distance between the recording medium and the objective lens, it is possible to apply the present invention by an arrangement similar to the first embodiment, and in a case having the maximum (minimum) value, it is possible to apply the present invention by an arrangement similar to the second or third embodiment.

In the present invention, it will be apparent that different embodiments can be arranged in a wide scope on the basis of the invention, without departure from the spirit and scope of the invention. The present invention is not limited by specific embodiments, other than being limited by the appended claims.

What is claimed is:

1. A focus control device in an optical recording and reproducing apparatus, comprising:
   optical detecting means having a plurality of optical detecting sections for detecting reflected light of an optical beam irradiated to an optical recording medium;
   error-signal generating means for generating a focus error signal on the basis of an output from said optical detecting means;
   focus regulating means for regulating a focusing state on a surface of said optical recording medium of said optical beam on the basis of said focus error signal;
   pseudo-focus-error-signal generating means for generating a pseudo focus error signal of a predetermined level which brings back a focusing point of said optical beam to a control target position;
   optical-beam-position judging means for judging whether or not the focusing point of said optical beam is spaced by a predetermined quantity from said control target position on the basis of outputs from optical detecting sections in said optical detecting means, said outputs from said optical detecting, sections in said optical detecting means being asymmetrical about said control target position; and
   error-signal selecting means for selectively switching and outputting one of said focus error signal that is an output from said error-signal generating means and said pseudo focus error signal as an error signal supplied to said focus regulating means in accordance with the shifting quantity of the focusing point of said optical beam from said control target position, on the basis of an output from said optical-beam-position judging means.

2. A focus control device according to claim 1,
   wherein said optical-beam-position judging means judges whether or not the focusing point in said optical beam is spaced by a predetermined quantity from said control target position on the basis of outputs from the optical detecting sections in said optical detecting means, and
   wherein said error-signal, selecting means selectively switches over an error signal supplied to said from regulating means, to said pseudo focus error signal from the focus error signal that is an output from said error-signal generating means when the focusing point of said optical beam is spaced by a predetermined quantity from said control target position, on the basis of an output from said optical-beam-position judging means.

3. A focus control device according to claim 2, further including:
   first computing means for computing outputs from optical detecting sections for generating a focus error signal in said optical detecting means and said first computing means for outputting a computation output to said error-signal generating means; and
   second computing means for computing outputs from partial optical detecting sections in said optical detecting means and for outputting a computation output to said optical-beam-position judging means.

4. A focus control device according to claim 3, wherein said second computing means computes the sum of outputs from partial optical detecting sections in said optical detecting means such that the computing output changes in accordance with a distance between the focusing point of said optical beam and said optical recording medium, and the focusing points of said optical beam are asymmetric with said control target position located between said focusing parts.

5. A focus control device according to claim 3, wherein said second computing means computes the sum of outputs from said optical detecting sections for generating a focus error signal in said optical detecting means such that a computing output changes in accordance with a distance between the focusing point of said optical beam and said optical recording medium, and the computing output monotonously increases of monotonously decreases at a position of the focusing point of said optical beam remote from said control target position, and
   wherein said optical-beam-position judging means compares the output from said second computing means with a pre-determined level, to thereby judge whether or not the focusing point of said optical beam is spaced by a pre-determined quantity from said control target position.

6. A focus control device according to claim 3,
   wherein said second computing means computes the sum of the outputs from the partial optical detecting sections in said optical detecting means such that the computing output changes in accordance with a distance between the focusing point of said optical beam and said optical recording medium, and the focusing point of said optical beam has a maximum value or a minimum value at a position remote from said control target position,
   wherein said optical-beam-position judging means compares the output from said second computing means with a predetermined level in the neighborhood of said maximum value or said minimum value, to thereby judge whether or not the focusing point of said optical beam is spaced by a predetermined quantity away from said control target position,
   wherein said focus control device is further provided with reset means for comparing the focus error signal of the output from said error-signal generating means with a predetermined level, to thereby detect that the focusing point of said optical beam approaches a predetermined quantity from said control target position, to output a reset signal,
   wherein said error-signal selecting means switches over an error signal supplied to said focus regulating means from the focus error signal of the output from said error-signal generating means to said pseudo focus error signal on the .basis of judging results of said optical-beam-position judging means, when the focusing point of said optical beam is spaced by a predetermined quantity away from said control target position, and
   wherein, when a reset signal is outputted from said reset means, an error signal supplied to said focus regulating means is switched from said pseudo focus error signal to the focus error signal of the output from said error-signal generating means.

7. A focus control device according to claim 6, wherein the output from said partial optical detecting sections computed by said second computing means is the output from parts of the optical detecting sections for generating a focus error signal.

8. A focus control device according to claim 6, wherein the outputs of said optical detecting sections computed by said second computing means is an output from an optical detecting section for generating a clock.

* * * * *